US009501437B2

(12) United States Patent
Chang

(10) Patent No.: US 9,501,437 B2
(45) Date of Patent: Nov. 22, 2016

(54) SCALABLE STORAGE SYSTEM HAVING MULTIPLE STORAGE CHANNELS

(71) Applicant: EMPIRE TECHNOLOGY DEVELOPMENT LLC, Wilmington, DE (US)

(72) Inventor: Hui Huang Chang, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 378 days.

(21) Appl. No.: 14/124,007

(22) PCT Filed: Nov. 15, 2012

(86) PCT No.: PCT/US2012/065380
§ 371 (c)(1),
(2) Date: Dec. 5, 2013

(87) PCT Pub. No.: WO2014/077823
PCT Pub. Date: May 22, 2014

(65) Prior Publication Data
US 2014/0156903 A1 Jun. 5, 2014

(51) Int. Cl.
| G06F 13/36 | (2006.01) |
| G06F 3/00 | (2006.01) |
| G06F 13/38 | (2006.01) |
| G06F 13/00 | (2006.01) |
| G06F 13/28 | (2006.01) |
| G06F 13/16 | (2006.01) |
| G06F 3/06 | (2006.01) |

(52) U.S. Cl.
CPC .......... *G06F 13/287* (2013.01); *G06F 3/0607* (2013.01); *G06F 3/0635* (2013.01); *G06F 3/0689* (2013.01); *G06F 13/1657* (2013.01)

(58) Field of Classification Search
CPC .. G06F 13/287; G06F 3/0635; G06F 3/0607; G06F 3/0689; G06F 13/1657
See application file for complete search history.

(56) References Cited

U.S. PATENT DOCUMENTS 7,334,070 B2 * 2/2008 Borkenhagen ...... G06F 13/1673
370/221
7,349,480 B2  3/2008 Tsatsanis et al.
8,312,046 B1 * 11/2012 Eisler ................ G06F 17/30091
707/609

(Continued)

OTHER PUBLICATIONS

"NASD Scalable Storage Systems" by Gibson et al. Proceedings of USENIX 1999, Linux Workshop, Monterey, CA, Jun. 9-11, 1999.*

(Continued)

*Primary Examiner* — Jing-Yih Shyu
(74) *Attorney, Agent, or Firm* — Ren-Sheng International

(57) ABSTRACT

One example scalable storage system may include a first storage channel including a first storage node and a second storage node. The first storage node is coupled with the second storage node via a serial link. The scalable storage system may include a multi-channel interface including an input-channel coupled with the first storage node and an output-channel coupled with the second storage node. After receiving a request, the multi-channel interface may direct the request via the input-channel to the first storage node of the first storage channel. The first storage node may process the request. If a request segment in the request is directed to the second storage node, the serial link may transmit the request segment from the first storage node to the second storage node, allowing the second storage node to process the request segment.

15 Claims, 8 Drawing Sheets

(56) References Cited

U.S. PATENT DOCUMENTS

| | | | |
|---|---|---|---|
| 8,489,811 B1* | 7/2013 | Corbett | G06F 17/30233 707/827 |
| 8,700,845 B1* | 4/2014 | Bowers | G11C 7/1003 711/110 |
| 9,116,624 B2* | 8/2015 | Canepa | G06F 3/0683 |
| 9,240,227 B2* | 1/2016 | Pyeon | G11C 5/066 |
| 2007/0050538 A1 | 3/2007 | Northcutt et al. | |
| 2007/0101070 A1 | 5/2007 | Matsunami et al. | |
| 2007/0130385 A1 | 6/2007 | Hosoya et al. | |
| 2008/0049505 A1 | 2/2008 | Kim et al. | |
| 2008/0189343 A1 | 8/2008 | Hyer et al. | |
| 2008/0239937 A1 | 10/2008 | Erickson et al. | |
| 2009/0063786 A1* | 3/2009 | Oh | G06F 11/1068 711/148 |
| 2009/0083476 A1 | 3/2009 | Pua et al. | |
| 2009/0300259 A1 | 12/2009 | Luo et al. | |
| 2010/0083027 A1* | 4/2010 | Oh | G06F 13/1689 713/601 |
| 2010/0083028 A1* | 4/2010 | Oh | G06F 1/08 713/601 |
| 2010/0250826 A1 | 9/2010 | Jeddeloh | |
| 2010/0325346 A1 | 12/2010 | Huang | |
| 2010/0325353 A1 | 12/2010 | Kim | |
| 2013/0286579 A1* | 10/2013 | De Spiegeleer | G06F 11/3034 361/679.33 |

OTHER PUBLICATIONS

"Design and Analysis of Flash Translation Layers for Multi-Channel NAND Flash-based Storage Devices", by Park et al. IEEE Transactions on Consumer Electronics, vol. 55, No. 3, Aug. 2009.*

"Parallel ATA", Wikipedia, Last Modified on Jul. 22, 2013, <retrieved on Jul. 24, 2013>, Retrieved from the Internet at <URL: http://en.wikipedia.org/wiki/Parallel_ATA>.

"Serial ATA", Wikipedia, Last Modified on Jul. 24, 2013, <Retrieved on Jul. 24, 2013>, Retrieved from the Internet at <URL: http://en.wikipedia.org/wiki/S-ATA>.

"SCSI", Wikipedia, Last Modified on Jul. 23, 2013, <Retrieved on Jul. 24, 2013>, Retrieved from the Internet at <URL: http://en.wikipedia.org/wiki/SCSI>.

"About USB Implementers Forum, Inc.", Universal Serial Bus about USB-IF, Jun. 1, 2005, <Retrieved on Jul. 24, 2013>, Retrieved from the Internet at <URL: http://web.archive.org/web/20050601032624/http://www.usb.org/about>.

By Network World Staff, "100G Ethernet Cheat Sheet", Network World, Nov. 19, 2009, <Retrieved on Jul. 24, 2013>, Retrieved from the Internet at <URL: http://www.networkworld.com/news/2009/111909-100g-ethernet-cheatsheet.html>.

"IEEE P802.3ba 40Gb/s and 100Gb/s Ethernet Task Force", Last Update: Jun. 19, 2010, <Retrieved on Jul. 24, 2013>, Retrieved from the Internet at <URL: http://www.ieee802.org/3/ba/>.

Sang-Hoon Park et al., "Design and Analysis of Flash Translation Layers for Multi-Channel NAND Flash-based Storage Devices", IEEE Transactions on Consumer Electronics, Aug. 2009, pp. 1392-1400, vol. 55, No. 3.

Jeff Boles, "SSDs Require New Array Architectures", Infostor, Posted on Aug. 1, 2009, <Retrieved on Jul. 26, 2013>, Retrieved from the Internet at <URL: http://www.infostor.com/index/articles/display/8047107146/articles/infostor/volume-13/Issue_8/Features/SSDs_require_new_array_architectures.html>.

Notification of Transmittal of the International Search Report and the Written Opinion of the International Searching Authority, PCT/US12/65380, Apr. 26, 2013.

Michael Eisler et al., "Data ONTAP GX: A Scalable Storage Cluster", USENIX Association, 5th USENIX Conference on File and Storage Technologies, 2007, pp. 139-152. ISA Retrieved on Mar. 25, 2013 and from the Internet at URL: <http://static.usenix.org/event/fast07/tech/full_papers/eisler/eisler.pdf>, entire document, especially p. 139, para 6, p. 141, para 2 to p. 142, para 1, p. 152, para4, Fig. 2.

* cited by examiner (700) A computer program product (702) Signal bearing medium (704) at least one of one or more instructions for receiving, by a multi-channel interface of the scalable storage system, a first request for accessing a first storage node and a second storage node in the scalable storage system;

transmitting, by the multi-channel interface, the first request to a first storage channel, wherein the first storage channel includes the first storage node and the second storage node;

transmitting, by the first storage channel, the first request to the first storage node via a first serial link in the first storage channel;

processing, by the first storage node, a first segment of the first request that is associated with the first storage node;

simultaneous to the processing of the first segment of the first request, transmitting, by the first storage node, a second segment of the first request to the second storage node via the serial link; and processing, by the second storage node, the second segment of the first request.

| (706) A computer readable medium | (708) A recordable medium | (710) A communications medium |
|---|---|---|

Fig. 7

SCALABLE STORAGE SYSTEM HAVING MULTIPLE STORAGE CHANNELS

CROSS REFERENCE TO RELATED APPLICATION

The present application is a U.S. National Stage filing under 35 U.S.C. §371 of International Application PCT/US2012/065380, filed on Nov. 15, 2012, entitled "A SCALABLE STORAGE SYSTEM HAVING MULTIPLE STORAGE CHANNELS." The International Application, including any appendices or attachments thereof, is hereby incorporated by reference in its entirety.

BACKGROUND

The performance of a data-centric application may be highly dependent on the latency or throughput of a data storage system. A conventional approach to increase the throughput of the data storage system is to use multiple storage devices, like in a RAID configuration, so that a request for data may be served by these multiple storage devices simultaneously.

Solid state devices may provide good random access speed and may have low energy consumption. However, data throughput of solid state devices may be limited by existing device interfaces, such as USB 2.0 and SATA. Although multiple solid state devices may be implemented in a storage architecture that is similar to the RAID configuration, existing device interfaces may nevertheless prevent the throughput rates available in the solid state devices from being fully utilized.

SUMMARY

In accordance with some embodiments of the present disclosure, a scalable storage system may include a first storage channel including a first storage node, a second storage node, and a first serial link. The first storage node may be coupled with the second storage node via the first serial link. The scalable storage system may include a multi-channel interface including a first input-channel coupled with the first storage node and a first output-channel coupled with the second storage node. For a first request transmitted from a computer system and received by the multi-channel interface, the multi-channel interface may be configured to direct the first request via the first input-channel to the first storage node of the first storage channel. The first storage node may be configured to process the first request. Upon determining that a request segment in the first request may be directed to the second storage node, the first serial link may be configured to transmit the request segment from the first storage node to the second storage node, allowing the second storage node to process the request segment.

In accordance with other embodiments of the present disclosure, a storage node may be configured to provide data storage in a scalable storage system, which may include an input-port configured to receive inputs from a multi-channel interface of the scalable storage system and an output-port configured to transmit outputs to the multi-channel interface of the scalable storage system. The storage node may further include a storage unit configured to utilize a solid-state storage space, and a data processor coupled with the input-port, the output-port, and the storage unit. The data processor may be configured to receive the inputs via the input-port, upon determining that the inputs is directed to the storage node, process the inputs by accessing the storage unit, and upon determining that at least a segment in the inputs is directed to another storage node that is coupled with the output-port of the storage node via a serial link, transmit the segment as the outputs to the another storage node via the output-port.

In accordance with further embodiments of the present disclosure, a method for providing data storage by a scalable storage system may include receiving, by a multi-channel interface of the scalable storage system, a first request for accessing a first storage node and a second storage node in the scalable storage system. The method may include transmitting, by the multi-channel interface, the first request to the first storage node via a first serial link of a first storage channel, wherein the first storage channel includes the first storage node, the second storage node, and the first serial link. The method may further include processing, by the first storage node, a first segment of the first request that is associated with the first storage node; simultaneous to the processing of the first segment of the first request, transmitting, by the first storage node, a second segment of the first request to the second storage node via the serial link; and processing, by the second storage node, the second segment of the first request.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the drawings:

FIG. 7 shows an illustrative embodiment of an example computer program product.

DETAILED DESCRIPTION

Figure 1:
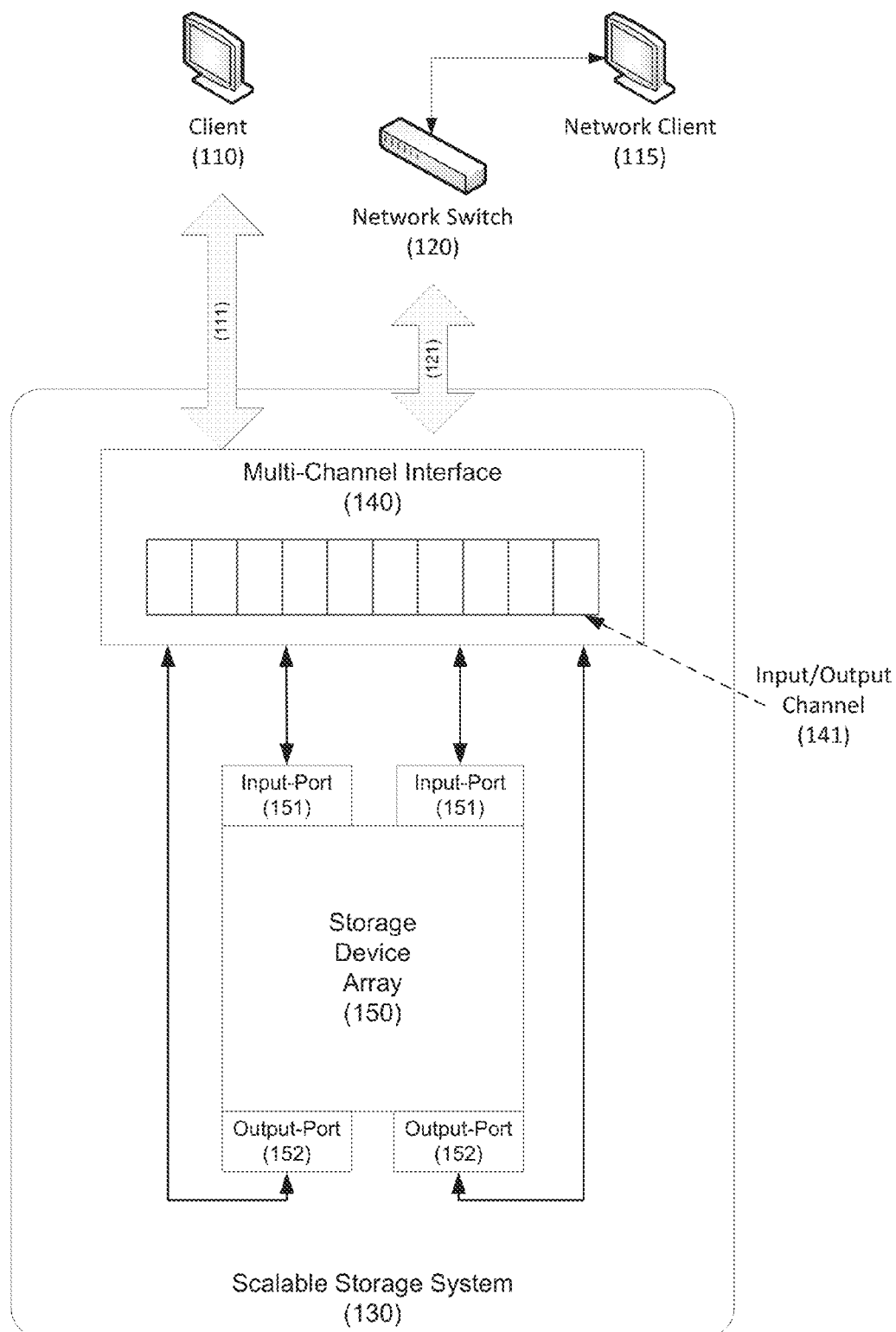
FIG. 1 shows a block diagram illustrating embodiments of a scalable storage system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatuses, computer programs, and systems related to a scalable storage system having multiple storage nodes arranged in one or more storage channels.

FIG. 1 shows a block diagram illustrating embodiments of a scalable storage system, arranged in accordance with at least some examples presented herein. In FIG. 1, a scalable storage system 130 may be a storage server for storing and retrieving data on behalf of one or more clients 110 and/or one or more network clients 115. A client 110 may be directly coupled with the scalable storage system 130 via one or more physical links. A network client 115 may be indirectly coupled with the scalable storage system 130 through a network switch 120. The client 110, the network client 115, and/or the scalable storage system 130 may be implemented using a personal computer (PC), workstation, laptop, tablet PC, handheld computing/communication device, cell phone, smart phone, or a similar device. The scalable storage system 130 may be configured to process data requests 111 and/or data requests 121 received from the client 110 and/or the network client 115, respectively. The data requests 111 and the data requests 121 may be file-level requests, block-level requests, or both.

In some embodiments, the scalable storage system 130 may be configured to include, among other components, a multi-channel interface 140 and a storage device array 150. The multi-channel interface 140 may include one or more input/output (IO) channels 141. The storage device array 150 may include one or more storage nodes for providing data storage. Each of the storage nodes in the storage device array 150 may have an input-port 151 and an output-port 152. Some of the storage nodes' input-ports 151 or output-ports 152 may be coupled with the corresponding IO channels 141 of the multi-channel interface 140. The input-ports 151 and the output-ports 152 may allow storage data to be transmitted between the multi-channel interface 140 and the storage device array 150.

In some embodiments, each IO channel 141 in the multi-channel interface 140 may support one or more communication standards such as, without limitation, Parallel ATA, Serial ATA, SCSI, USB, and IEEE 1394/i-Link. Thus, a client 110 may utilize one or more links that are compatible with one or more of the above communication standards to couple to one or more IO channels 141. Further, each IO channel 141 in the multi-channel interface 140 may support network communication standards such as, without limitation, Ethernet, Gigabit Ethernet, and Optical Fiber Communication. A single network client 115 may be able to utilize one or more IO channels 141 via the network switch 120.

In some embodiments, the IO channels 141 in the multi-channel interface 140 may be divided into multiple sub-groups, each including one or more IO channels 141. For example, the client 110 may be coupled with one sub-group of the IO channels 141, and the network client 115 may be coupled with another sub-group of the IO channels 141. In other words, each IO channel 141 in a sub-group may be dedicated to serve either the client 110 or the network client 115 it is coupled with. Thus, the client 110 may take full advantage of the throughputs provided by the sub-group of the IO channels 141 it is coupled with, without having to share the throughputs with other clients 110.

In some embodiments, multiple clients 110 or network clients 115 may be concurrently coupled with multiple IO channels 141 utilizing multiple-input/multiple output (MIMO) technology. The MIMO modulation and demodulation technologies may allow a transmitter to concurrently communicate with multiple receivers, and a receiver to concurrently serve multiple transmitters. In this case, each of the multiple clients 110 or the network clients 115 may be deemed a transmitter, and each of the IO channels 141 may be deemed a receiver. Thus, a single IO channel 141 may serve multiple clients 110 or network clients 115 at the same time, thereby greatly increasing the throughputs and versatility of the multi-channel interface 140.

In some embodiments, the scalable storage system 130 may be configured to receive from the client 110 or the network client 115 one or more requests 111 and 121 for storing data to, or retrieving data from, the storage device array 150. Each of the requests 111 and 121 may include one or more commands instructing the scalable storage system 130 to utilize M number of IO channels 141 to access the storage device array 150. M may be a number between 1 and the total number of IO channels 141 in the multi-channel interface 140. Details of the requests 111 and 121, the commands, as well as the storage device array 150 are further described below.

In some embodiments, the storage device array 150 may include storage nodes each of which utilizes one or more solid-state storage devices. The solid state storage devices may include flash-based storage devices, RAM-based storage devices, or others. The flash-based storage devices may also be referred to as flash memory or flash memory chips. The scalable storage system 130 may be configured with a scalable architecture, which allows access to some or all of the storage nodes in parallel. Thus, by increasing the number of parallel access to M, the scalable storage system 130 may increase its data throughputs to M times the maximum data throughput of a single solid-state storage device.

Figure 2:
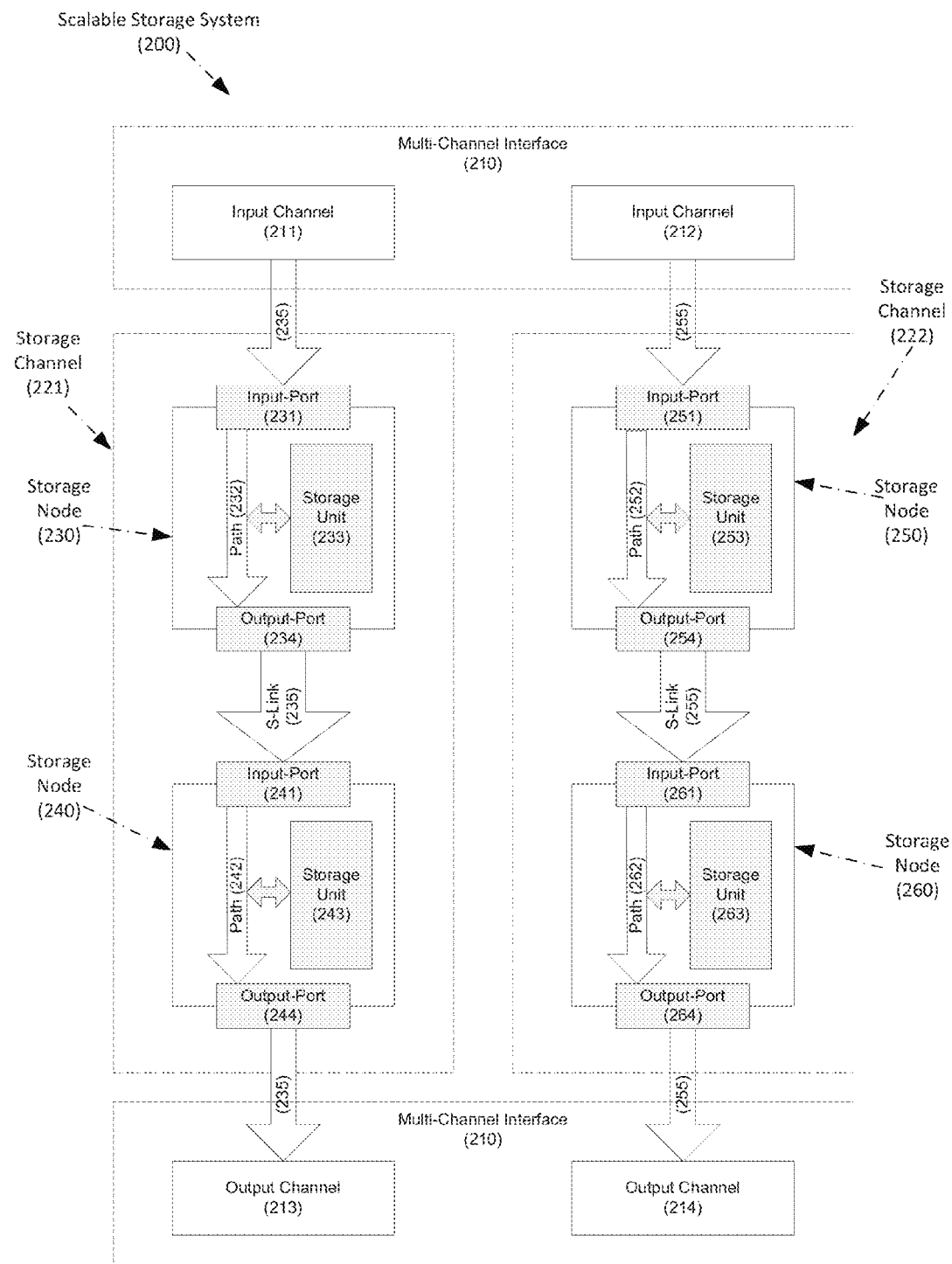
FIG. 2 shows illustrative embodiments of a scalable storage system having one-dimension storage channels.

FIG. 2 shows illustrative embodiments of a scalable storage system having one-dimension storage channels, arranged in accordance with at least some examples presented herein. The scalable storage system 200, which is similar to the scalable storage system 130 of FIG. 1, may have a multi-channel interface 210, and multiple storage nodes 230, 240, 250, and 260. The multi-channel interface 210, which is similar to the multi-channel interface 140 of FIG. 1, may have multiple IO channels 211, 212, 213 and 214. In some embodiments, the IO channels 211 and 212 may be deemed input channels for receiving input requests or input data from a client, and the IO channels 213 and 214 may be deemed output channels for outputting data to the client. In other embodiments, the IO channels 211 and 212 may be configured as output channels, and the IO channels 213 and 214 may be configured as input channels.

In some embodiments, the scalable storage system 200 may include a matrix of storage nodes, such as the storage nodes 230, 240, 250, and 260. Each of the storage nodes may serve as an independent data-storing and/or data-retrieving module, under the control and management of the scalable storage system 200. The matrix of storage nodes may be organized into multiple storage channels, each including a fixed number of storage nodes. In other words, the number of storage nodes in the matrix is equal to M×N, with M representing a number of storage channels, and N representing a number of storage nodes in each storage channel. M may or may not equal to N.

In some embodiments, a storage channel may provide high-throughput and high-concurrency data access utilizing the set of storage nodes contained therein. In other words, the functionalities of a storage channel are provided by its storage nodes performing their individual data storage functions and/or data transmission functions. Further, the throughput of a storage channel may be increased by having more than one storage node concurrently performing data services. The throughput of the storage channel may also be improved by each of its storage nodes participating in the transmitting of data in and/or out of the storage channel. A specific storage channel may interact with the multi-channel interface 210 through a dedicated input channel and a dedicated output channel. For example, in FIG. 2, the storage nodes 230, 240, 250, and 260 can be organized into two storage channels 221 and 222. The storage channel 221 may include storage nodes 230 and 240, and may be associated with the input channel 211 and the output channel 213. Likewise, the storage channel 222 may include storage nodes 250 and 260, and may be associated with the input channel 212 and the output channel 214.

In some embodiments, each storage node in the scalable storage system 200 may include, among other components, an input-port, an output-port, and a storage unit. The storage unit in a storage node may be implemented using non-volatile conventional storage drives or non-volatile solid-state storage devices. Storage provided by a flash-based solid-state storage device may be organized into one or more flash pages. Multiple flash pages may form a flash block. Read and write operations performed on the flash-based storage device may be page-based, and erase operations may be flash-block based. The input-port of a storage node may be an interface for receiving data and requests either from an input channel of the multi-channel interface 210, or from an output-port of another storage node. Likewise, the output-port of a storage node may be an interface for transmitting data either to an input-port of another storage node, or to an output channel of the multi-channel interface 210.

In some embodiments, the storage nodes in a storage channel may be organized into a daisy-chain. In the daisy-chain, each storage node may be coupled with a storage node positioned to its front, to another storage node located at its back, or both. Thus, the daisy-chain can be a sequence of storage nodes having a head storage node, a tail storage node, and optionally one or more storage nodes linked one-by-one in-between. A serial link in the storage channel may provide the necessary physical connections to tie the storage nodes, the input channel, and the output channel together. In other words, the serial link may couple the head storage node's input-port with the input channel and the tail storage node's output-port with the output channel. Further, for any two adjacent storage nodes (denoted a first storage node and a second storage node) in the daisy-chain, the first storage node's output-port may be coupled with the second storage node's input-port by the serial link. Thus, the daisy-chain supports a data transmission that flows from the input channel to the head storage node, then one-by-one through each of the storage nodes in the daisy-chain, all the way to the tail storage node. Output data transmitted to the tail storage node may then be delivered from the tail storage node to the output channel. Thus, from the perspective of a specific storage node on the daisy-chain, any position on the daisy-chain that is closer to the head storage node than the specific storage node may be deemed "upstream", and any position on the daisy-chain that is closer to the tail storage node than the specific storage node may be deemed "downstream."

In FIG. 2, the storage channel 221 may have a daisy-chain of storage nodes 230 and 240 formed using a serial link 235. Thus, the serial link 235 can be used to couple the storage node 230's input-port 231 with the input channel 211, and the storage node 240's output-port 244 with the output channel 213. Further, the serial link 235 also may couple the storage node 230's output-port 234 with the storage node 240's input-port 241. In the storage channel 221, storage node 230 may be deemed the head storage node, and storage node 240 may be deemed the tail storage node. In some embodiments, one or more additional storage nodes may be added to the storage channel 221, and be placed between the storage node 230 and the storage node 240 in the daisy-chain. Storage channel 222 may have a similar configuration as the storage channel 221.

In some embodiments, the storage channels 221 and 222 may be deemed a scalable serial-connection configuration since additional storage nodes may be added into these storage channels without requiring an increase in the pin counts in the IO channels 211 and 213. Even though the data bandwidth of a single storage node may be limited by the read/write speed of the solid-state storage device contained therein, the storage channels 221 and 222 may have much higher data throughputs when the throughputs of all the storage nodes in these storage channels can be utilized concurrently. Since the time to access a single storage node may be about a couple of micro-seconds, the latency for accessing all the storage nodes in a storage channel may be small in comparison to the aggregated channel bandwidth. For example, assuming flash-based storage device in a storage node may have a 50 MB/s data throughput, a single storage channel having 20 storage nodes may achieve up to 1 GB/s data throughput. A scalable storage system having 20 such storage channels may provide up to 20 GB/s of data throughput, which may be much higher than the throughput of conventional device interfaces.

In some embodiments, a multi-command protocol may be adapted to take advantage of the data throughput available in the scalable storage system 200. A request transmitted from a client to the scalable storage system 200 may have a structure that is compatible with the multi-command protocol, and can carry more than one read or write command. For example, a request may include one or more read commands, one or more write commands, and/or data associated with the one or more write commands. The number of commands in the request is not limited in the multi-command protocol. For example, for high-speed device interfaces that support above 100 GB/s bandwidths, hundreds of commands may be issued concurrently in a single request.

In some embodiments, a read command in a request issued by a client may include information identifying the storage channels and/or the storage nodes that are associated with the data requested by the read command ("read-data"). For example, the read-data may be stored as multiple segments in one or more storage nodes, which may belong to one or more storage channels. The client may identify the storage channels as well as the corresponding storage nodes in these storage channels that are associated with the read-data, and carry the identification information in the read command. Upon receiving the request and extracting the read command from the request, the scalable storage system 200 may instruct the multi-channel interface 210 to deliver the read command to the input channels that are associated with the storage channels identified in the read command. Each input channel may then transmit the read command to the corresponding storage channel. Alternatively, the multi-channel interface 210 may deliver the request to all of the input channels and storage channels, and instruct each of the storage channels to individually and concurrently process the request and determine whether it is identified in any command contained in the request.

In FIG. 2, assuming a read command of a request is received by the input channel 211, the serial link 235 may deliver the read command to the storage node 230 via the input-port 231. In some embodiments, the storage node 230 may be configured to evaluate the read command and determine whether it is identified by the read command. If the storage node 230 is not identified by the read command, then the storage unit 233 does not include any data segments associated with the read-data, and the read command is "not intended" for the storage node 230. In this case, the storage node 230 may deliver the read command through a path 232 to the output-port 234, allowing the read command to be transmitted from the output-port 234 to the input-port of a subsequent storage node in the daisy-chain. The subsequent storage node may be configured to perform similar function as the storage node 230, and forward the read command one-by-one downstream through the daisy-chain, until the read command is delivered to the tail storage node (e.g., storage node 240) of the daisy-chain.

In one example, storage node 230 may be one of the storage nodes in a storage channel that include segments of the read-data. Upon a determination that the read command is intended for itself, the storage node 230 may retrieve data segments from the storage unit 233 following the instructions of the read command. In one embodiment, the storage node 230 may be configured to perform the data retrieving operation concurrently to the above-described delivering of the read command to the subsequent storage node. That is, the read command may be delivered to one or more downstream storage nodes, at the same time or substantially at the same time as the storage node 230 retrieving the data segments. Further, multiple storage nodes may be configured to process the read command and retrieve corresponding data segments from their respective storage units concurrently.

In some embodiments, data segments retrieved by the storage node 230 may be delivered in similar fashion as the delivering of the read command toward the tail storage node 240. Thus, the storage node 240 may be configured to obtain, from time to time, one or more data segments from its own storage unit 243 and/or from one or more upstream storage nodes in the storage channel 221. As the tail storage node, the storage node 240 may be configured to deliver these data segments through its output-port 244 to the output channel 213. The multi-channel interface 210 may be configured to subsequently send these data segments to the client, which may reassemble the data segments received from one or more output channels into the read-data.

In some embodiments, upon a determination that the read command is intended for itself, the storage node 230 may remove one or more sections of the read command that are relevant to itself but not to other storage nodes, and transmit the remaining portion of the read command as a "request segment" to the downstream storage nodes. Such an approach may improve the performance of the other storage nodes since they no longer have to process unnecessary data. Thus, if a specific storage node on the daisy-chain receives a request segment including identification information only relevant to itself, the specific storage node may skip the transmitting of any request segment downstream, knowing that the read command is not intended for any of the downstream storage nodes.

In some embodiments, the input channel 211 may be configured to receive a write command in a request issued by a client. The write command may include information identifying the storage channels and/or the storage nodes for storing data associated with the write command ("write-data"). For example, write-data may be stored as multiple segments into one or more storage nodes, which may belong to one or more storage channels. The client may be configured to identify the storage channels as well as the corresponding storage nodes in these storage channels, and carry the identification information in the write command and the write-data. Upon receiving the request and extracting the write command and/or the write-data from the request, the scalable storage system 200 may instruct the multi-channel interface 210 to concurrently deliver the write command and/or segments of the write-data to the input channels that are associated with the storage channels identified in the write command. Each input channel may be configured to subsequently transmit the received write command and/or the segments of the write-data to the corresponding storage channel in a request. Alternatively, the multi-channel interface 210 may be configured to deliver the request to all of the input channels and storage channels, and instruct each of the storage channels to individually and concurrently process the request and determine whether it is identified in any command contained in the request.

In some embodiments, the write command and/or segments of the write-data may be concurrently delivered to multiple storage nodes in a specific storage channel. Taking the example of storage channel 222, the storage node 250 may be the first one to receive the write command and/or the segments of write-data. Upon a determination that the write command and/or the segments of the write-data are not intended for itself, the storage node 250 may transmit these to a subsequent storage node in the daisy-chain of the storage channel 222. Alternatively, if the storage node 250 determines that the write command and/or one or more segments of the write data are intended for itself, it may store the relevant segments of the write data to its storage unit 253, concurrently sending the write command and/or segments of the write-data downstream through the daisy-chain. In other embodiments, the storage node 250 may remove sections of the write command and/or one or more segments of the write-data that are related to itself, and transmit the remaining data as a request segment through the storage channel 222.

Thus, the scalable storage system 200 may increase storage data throughputs by allowing concurrent accessing of the multiple storage channels. Each storage channel in the scalable storage system 200 may further be configured to allow concurrent access to its multiple storage nodes, even when the storage unit in the storage node is implemented using conventional solid-state storage devices with limited throughputs.

Figure 3:
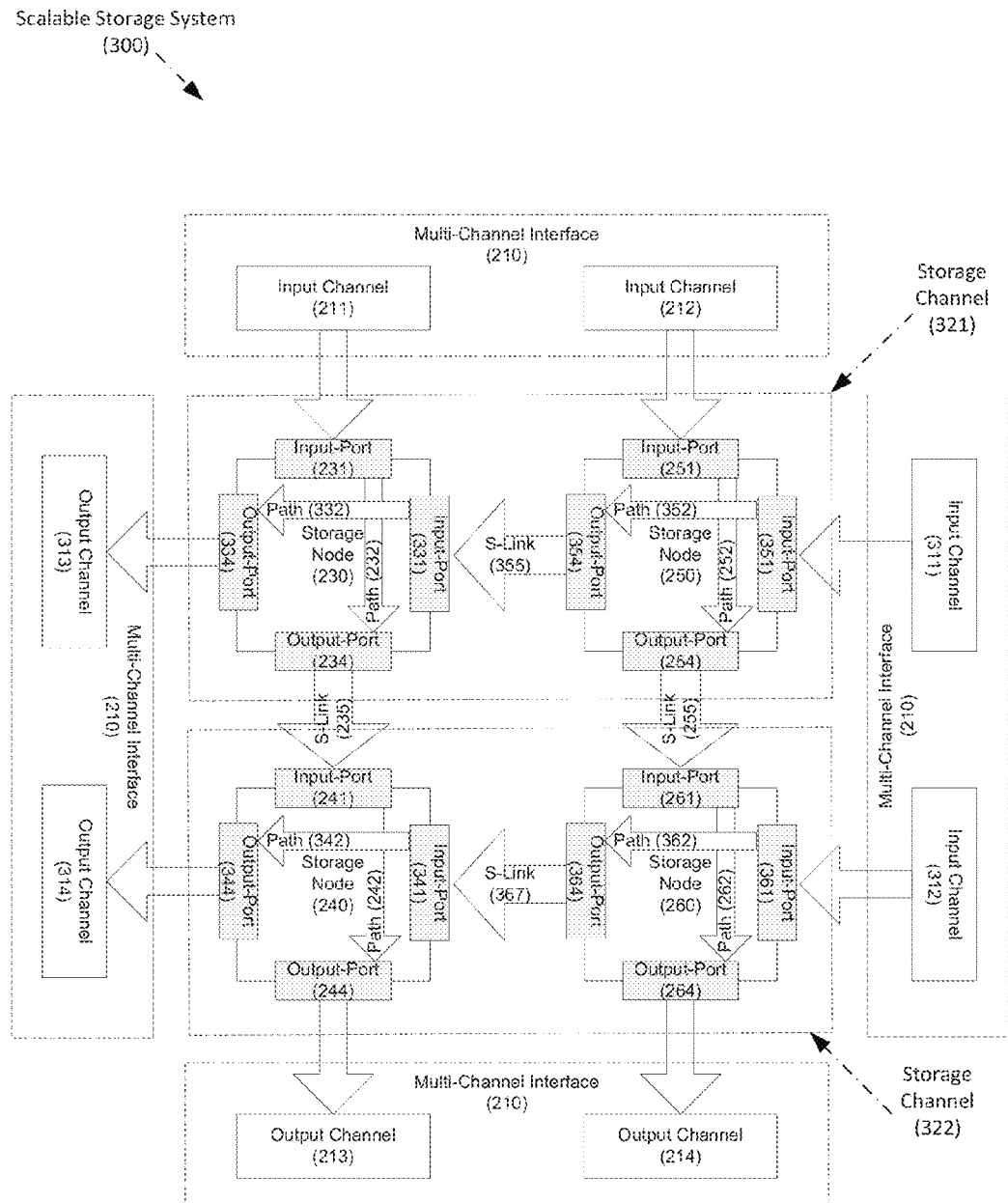
FIG. 3 shows illustrative embodiments of a scalable storage system having two-dimension storage channels.

FIG. 3 shows illustrative embodiments of a scalable storage system having two-dimensional storage channels, arranged in accordance with at least some examples presented herein. The scalable storage system 300 may be constructed based on the scalable storage system 200 of FIG. 2. That is, in addition to having all the components of the scalable storage system 200, the scalable storage system 300 may have IO channels 311, 312, 313, and 314 in the multi-channel interface 210. Further, the scalable storage system 300 may include a second dimension of storage channels 321 and 322 that are formed based on the storage nodes 230, 240, 250, and 260. Therefore, the second-dimension storage channels 321 and 322 may share some of storage nodes with the first-dimension storage channels 221 and 222 of FIG. 2 (storage channels 221 and 222 are not shown in FIG. 3).

In some embodiments, similar to the first-dimension storage channels, each of the second-dimension storage channels 321 and 322 may have their own dedicated input channel and output channel (e.g., input channel 311 and output channel 313 for storage channel 321). Storage nodes in a second-dimension storage channel may also be configured as a daisy-chain having a head storage node and a tail storage node coupled with their corresponding input channel and output channel. Thus, except for having different sets of storage nodes, the second-dimension storage channels are similar to the first-dimension storage channels. The second-dimension storage channels may have different arrangements of the storage nodes compared to the first-dimension storage channels. Assuming the number of storage nodes in the matrix is equal to M× N, in the first-dimension configuration, M may represent a number of first-dimension storage channels, and N may represent a number of storage nodes in each first-dimension storage channel. In the second-dimension configuration, N may represent a number of second-dimension storage channels, and M may represent a number of storage nodes in each of the second-dimension storage channels.

In some embodiments, to support the two-dimension channel configuration, each storage node in the scalable storage system 300 may further include, among other components, a second set of input-port and output-port for constructing a daisy-chain in a second-dimension storage channel. Taking the example of storage node 230, the second set of input-port 331 and output-port 334 may be utilized to couple to a serial link 355 of the storage channel 321. Each storage node may also include the necessary connections, so that data may be transmitted from the second input-port to the second output-port or from any input-port to any output-port. For example, the storage node 230 may have a path 332 that allows data received from the input-port 331 to be transmitted to the output-port 334. Data received from the input-port 331 may also be transmitted to the output-port 234, just as data received from the input-port 231 may be delivered to either the output-port 234 or the output-port 334.

In some embodiments, each storage node in this two-dimension channel configuration may be accessed from two storage channels that belong to these two different dimensions. Thus, data to be stored to the storage unit of the storage node 230 may be received either from the input channel 211 and the storage channel 221 of FIG. 2, or via the input channel 311 and the storage channel 321. Likewise, data may be retrieved from the storage unit of the storage node 230 and delivered to the output channel 213 via the storage channel 221 of FIG. 2, or to the output channel 313 via the storage channel 321. The details of the storage node may be further described below.

In some embodiments, multiple requests or commands may be issued to access a single storage node via different input channels and different storage channels. For example, a read command may be delivered to the input channel 212 to retrieve data stored in the storage channel 222 of FIG. 2, and specifically stored in the storage node 260. A write command may concurrently be delivered to the input channel 312 to write data to the storage channel 322, and specifically to the storage node 260. Thus, the storage node 260 may simultaneously receive two commands intended for itself from two input-ports 261 and 361, respectively. By concurrently processing these two commands, the storage node 260 may improve the data throughput of the scalable storage system 300, without increasing the number of storage devices.

Figure 4:
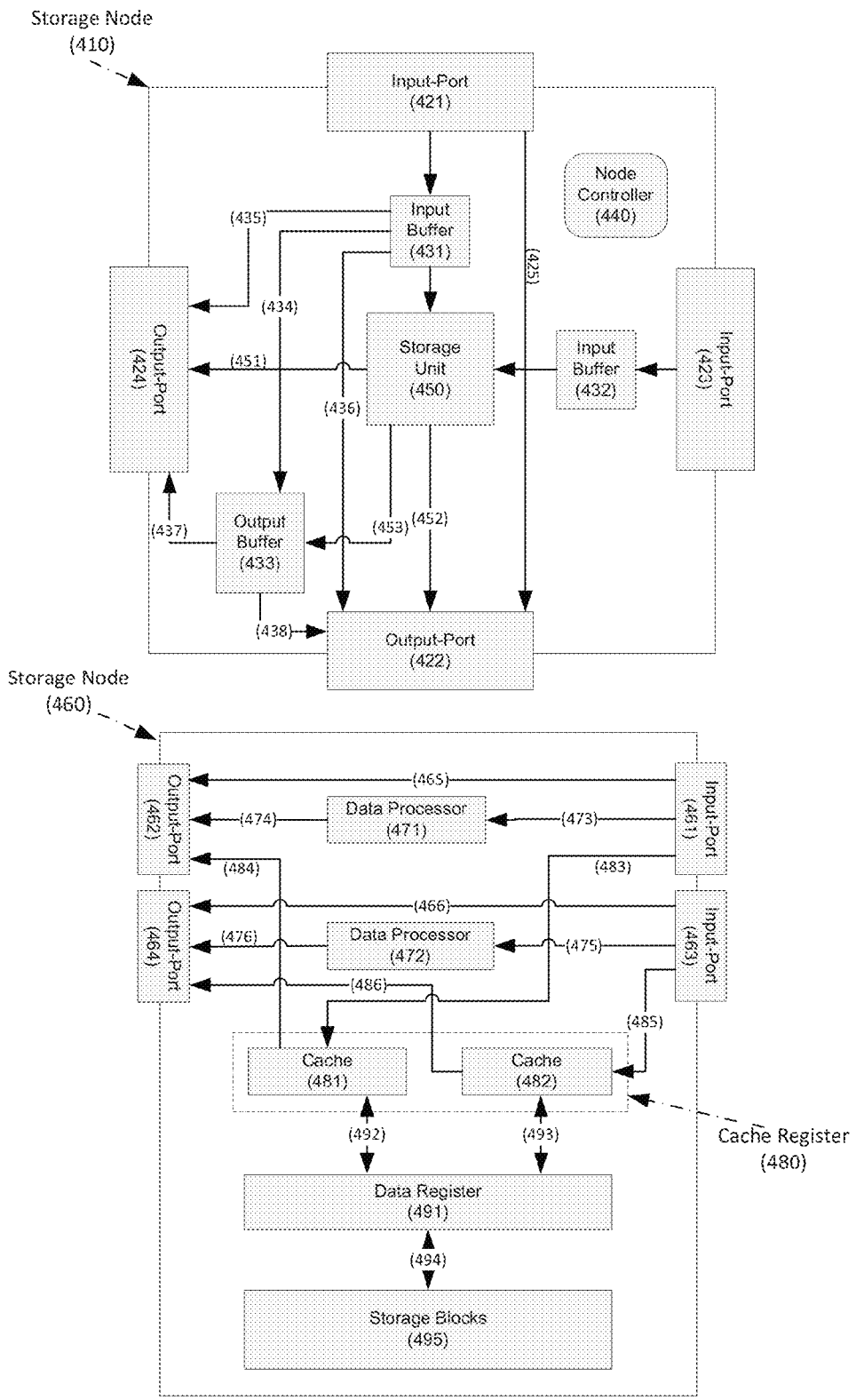
FIG. 4 show illustrative embodiments of storage nodes suitable for a two-dimension channel configuration.

FIG. 4 shows illustrative embodiments of storage nodes suitable for a two-dimension channel configuration, arranged in accordance with at least some examples presented herein. In FIG. 4, the storage nodes 410 and 460 may be similar to the storage nodes 230-260 of FIG. 3. Specifically, the storage node 410 may include input-ports 421 and 423, as well as output-ports 422 and 424, all of which are similar to the input-ports and output-ports of FIG. 3. The storage node 410 may also include, without limitation, input buffers 431 and 432, a node controller 440, a storage unit 450, and an output buffer 433.

In some embodiments, the node controller 440 may be configured to manage and provide the functionalities of the storage node 410 with respect to data storage and data transmission. The storage unit 450 may be implemented using solid-state storage devices. The input buffer 431, the input buffer 432, and/or the output buffer 433 may be a storage buffer having a size from a few bytes to one or more flash pages. The input buffer 431 and the input buffer 432 may be associated with the input-port 421 and the input-port 423 respectively. The output buffer 433 may be associated with the output-ports 422 and 424.

In some embodiments, "input-data" may refer to data received by an input-port of a storage node. The input-data may include a request, a command, write-data that is associated with a write command, and/or read-data that has been retrieved by an upstream storage node in response to a read command. The input-data received by the input-port 421 may be temporarily stored in the input buffer 431 if the node controller 440 cannot immediately process the input-data. In other words, the node controller 440 may evaluate and process the input-data either directly obtained from the input-port 421 or already stored in the input-buffer 431. In some embodiments, the node controller 440 may process the input-data by parsing the information contained therein for destination information. If the destination information indicates that the input-data is intended for the storage node 410, then the node controller 440 may perform additional functions based on the input-data. For example, the node controller 440 may retrieve data from the storage unit 450 if the input-data contains a read command. The node controller 440 may also be configured to extract write-data from the input-data, and write the write-data to the storage unit 450.

In some embodiments, "output-data" may refer to data to be transmitted out of an output-port of a storage node. The output-data may include requests, commands, write-data that are directed to one or more downstream storage nodes, and/or read-data that are forwarded from one or more upstream storage nodes. In some situations, the output-data of a storage node may include input-data that is received from the storage node's input-port, but not intended for the storage node. In this case, the node controller 440 may transmit the output-data via a bypass path to one of the output-ports, depending on where the output-data is located in the storage node. For example, if the output-data is input-data being received from the input-port 421, the output-data may directly be transmitted to the output-port 422 via a bypass path 425. If the output-data is cached in the input buffer 431, it may be transmitted to the output-port 422 via a bypass path 436, or to the output-port 424 via a bypass path 435. Further, the output-data may be temporarily stored in the output buffer 433 (via a path 434 or a path 453) before being transmitted to the output-port 422 (via a path 438) or the output-port 424 (via a path 437).

In other situations, the output-data may also include read-data that is retrieved from the storage node's own storage unit, in response to a read command directed to the storage node. For example, the read-data may be retrieved from the storage unit 450, and transmitted as output-data either to the output-port 422 (via a data path 452) or to the output-port 424 (via a data path 451). Alternatively, the output-data may first be stored in the output buffer 433 before transmitting to the output-ports 422 and/or 424 via the path 438 and/or a path 437, respectively. In some embodiments, bypass paths that are similar to paths 425, 435, and 436 may also be constructed from the input-port 423 and/or the input buffer 432 to the output-port 422 and/or the output-port 424. Thus, these bypass paths may reduce latency in transmitting data through the daisy-chain.

In some embodiments, the storage node 460 may be constructed using a conventional flash-based solid-state storage device. A conventional flash-based storage device may typically include a cache register 480, a data register 491, and one or more storage blocks 495. Each of the cache register 480 and the data register 491 may occupy e.g., about 8K bytes of flash-based storage space. The storage space in the storage blocks 495 may be organized into a page-block-plane-device hierarchy. For example, each flash page may have a size of about 4K bytes. About 128 flash pages may form a flash block. About 2048 flash blocks may form a flash plane. And each flash-based storage device may have e.g., 2 or 4 flash planes of storage.

In some embodiments, a conventional flash-based storage device may be incorporated into the storage node 460 with additional components such as the input-ports 461 and 463, the output-ports 462 and 464, the data processors 471 and 472, as well as various data paths (e.g., paths 465 and 466). The cache register 480 may be divided into caches 481 and 482, which may be used as the input buffers associated with the input-ports 461 and 463, respectively. The caches 481 and 482 may also be used as an output buffer that is associated with the output-ports 462 and 464. The data throughputs (e.g., about 560 MB/s) between the cache register 480 and the data register 491 may be much faster than the data throughputs (e.g., about 40 MB/s) between the data register 491 and the storage blocks 495. Thus, the conventional flash-based storage device is suitable for providing data storage and data transmission functions for the storage node 460.

In some embodiments, the data processors 471 and 472 may be configured to perform functions that are similar to the node controller 440 of the storage node 410. For example, when a request/command is received via the input-port 461 (through a path 473) or the input-port 463 (through a path 475), the data processor 471 or the data processor 472 may evaluate the destination information in the input-data, and determine whether to route the input-data to the cache 481 or the cache 482, or to the output-port 462 (via a path 474) or the output-port 464 (via a path 476). If the destination information indicates that the input-data is not directed toward the storage node 460, then the data processor 471 or the data processor 472 may utilize a bypass path 465 or a bypass path 466 to quickly transmit the input-data as output-data to a storage node that is coupled with either the output-port 462 or the output-port 464.

In some embodiments, in a data-storing operation, write-data received from the input-port 461 may first be transmitted to the cache 481 via a path 483. Afterward, the data in the cache 481 may then be transmitted to the data register 491 via a bus 492, and the data in the data register 491 may subsequently be transmitted to the storage blocks 495 via a bus 494. Likewise, data received from the input-port 463 may be stored to the cache 482 via a path 485. The data in the cache 482 may then be transmitted to the data register 491 via a bus 493, and subsequently stored to the storage blocks 495 via the bus 494.

In some embodiments, in a data-retrieving operation, read-data retrieved from the storage blocks 495 may be transmitted to the data register 491, and then to either the cache 481 or the cache 482. The retrieved data in the cache 481 may be delivered to the output-port 462 via a path 484. Similarly, the retrieved data in the cache 482 may be delivered to the output-port 464 via a path 486. The above data-storing and data-retrieving operations may be conducted concurrently with the data processors 471 and 472 performing data transmission functions.

Figure 5:
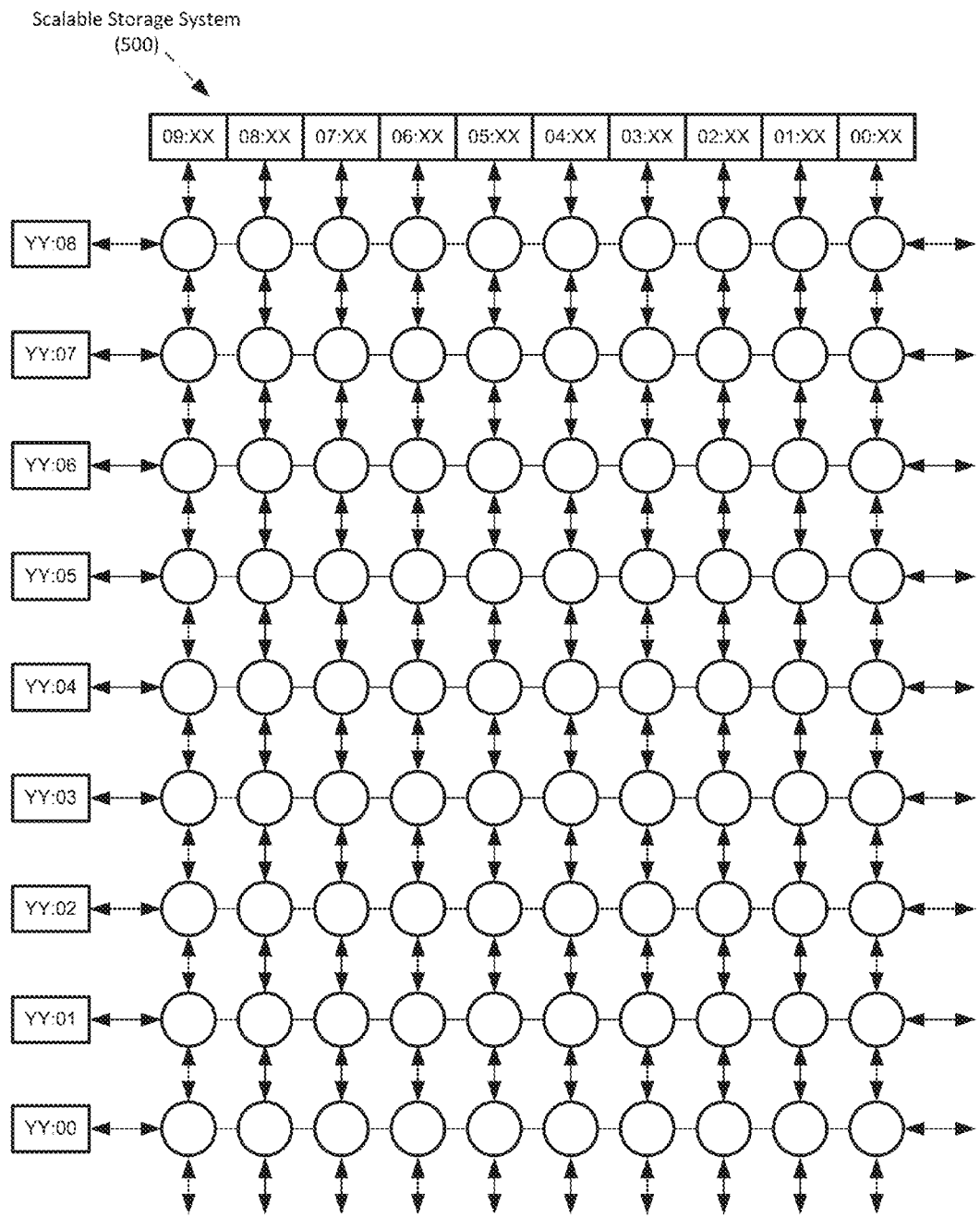
FIG. 5 shows illustrative embodiments of a scalable storage system having multi-dimensional and bi-directional storage channels.

FIG. 5 shows illustrative embodiments of a scalable storage system having multi-dimensional and bi-directional storage channels, arranged in accordance with at least some examples presented herein. The storage nodes in the scalable storage system 500 may be addressed using an YY:XX addressing scheme, with YY representing the address of a storage node in the first dimension, and XX representing the address of a storage node in the second dimension. For example, in FIG. 5, "08:05" may identify the storage node which is located at the "08" storage channel (second storage channel counting from left to right), and the "05" storage channel (fourth storage channel counting from top to bottom).

In FIG. 5, the scalable storage system 500 may be capable of providing high data throughput by integrating a large number of storage nodes into the multi-dimensional storage channels. Having a large number of storage nodes in a storage channel may increase the latency in transferring data through the storage channel. Still, for a storage channel having 20 storage nodes, if the latency of transferring 1 page of data through a single storage node is 2 micro-seconds, then the total latency for a storage channel having 1 GB/s throughput rate may be a manageable 40 micro-seconds.

When the storage nodes are under a multi-dimension channel configuration, the scalable storage system 500 may further double its data throughput. Since the data communications among the storage nodes are independent and separated from the multi-channel interface of the scalable storage system 500, by utilizing high-speed physical interfaces (e.g., USB 3.0) to concurrently access the multi-channel interface, the number of the storage nodes in the scalable storage system 500 can be determined in order to achieve a certain data throughput.

For example, a storage node may utilize a conventional flash-based storage device that has a page size of 4 KB, has a storage capacity of 8 GB, and can provide 50 MB/s of data throughput. A storage channel may require 80 of these storage nodes to achieve a 4 GB/s data (80×50 MB/s) throughput. When 80 of these storage channels are employed in the scalable storage system 500, the total capacity may be 51.2 TB (i.e., 80×80×8 GB). The total throughput may be 320 GB/s from a single dimension of storage channels. However, the latency for each storage channel may be 80 micro seconds (i.e., 80×4 KB/4 GB). When the scalable storage system 500 employs a two-dimension channel configuration, the latency for each storage channel may be reduced to 40 micro seconds.

The scalable storage system 500 may be configured with bi-directional storage channels that allow data to be transmitted in two opposite directions. In some embodiments, each bi-directional storage channel may be configured with two serial links (a first serial link and a second serial link) that connect the same set of storage nodes in the bi-directional storage channel. Each storage node in the bi-directional storage channel may also be configured with a first set of input-port and output-port that correspond to the first serial link, and a second set of input-put and output-port that correspond to the second serial link. Each storage node for the bi-directional storage channel may be similar to the storage node (e.g., storage node 230) of FIG. 3, which has dedicated input-ports and output-ports for two serial links.

Compared to the two-dimensional storage channel configuration of FIG. 3, each bi-directional storage channel may have a first serial link (e.g., serial link 355 of FIG. 3) configured to transmit data in one direction. To configure a second serial link that transmits data in opposite direction of the serial link 355 of FIG. 3, the second serial link may connect the input channel 211 with the input-port 231 of the storage node 230, connect the output-port 234 of the storage node 230 with the input-port 251 of the storage node 250, and connect the output-port 254 of the storage node 250 with the output channel 314. Thus, the second serial link, which may transmit data from the storage node 230 to the storage node 250, has an opposite transmission direction compared to the serial link 355, which transmits data from the storage node 250 to the storage node 230.

In other embodiments, a bi-directional serial link may be configured to transmit data either upstream or downstream in the bi-directional storage channel. To facilitate bi-directional data transmission, the input channel and output channel that are connected with the bi-directional serial link may be configured to perform the input and/or the output functionalities. Likewise, the input-port and the output-port of each storage node in the bi-directional storage channel may be configured to perform dual input/output roles as well, so that the bi-directional serial link may utilize an input-port for outputting purposes, and an output-port for inputting purposes. The internal components of a storage node may facilitate the data transmission of outputting via the input-port or the inputting via the output-port based on the bi-directional serial link's instructions.

Figure 6:
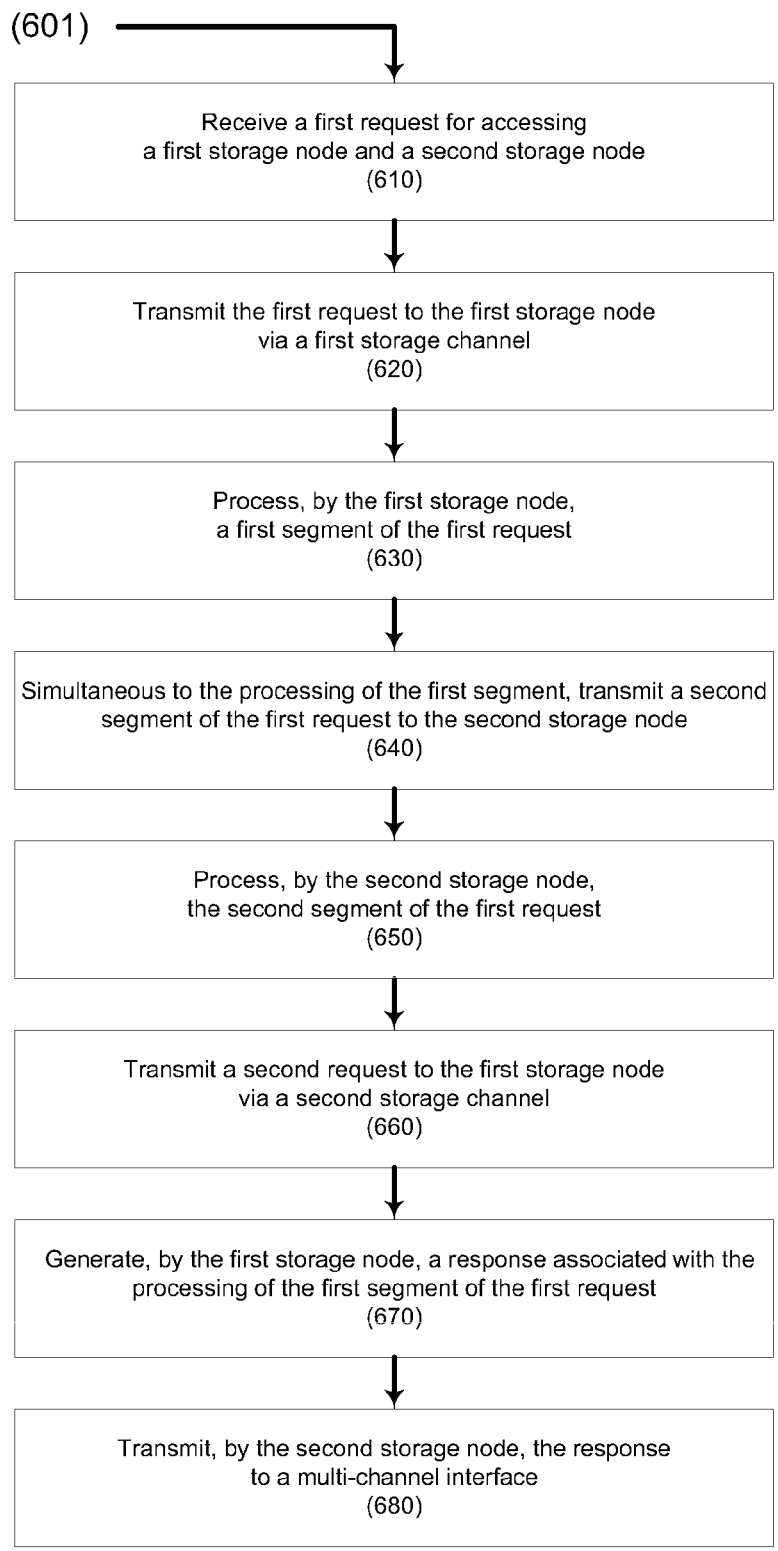
FIG. 6 shows a flow diagram of an illustrative embodiment of a process for providing data storage by a scalable storage system.

FIG. 6 shows illustrative embodiments of a process 601 for providing data storage by a scalable storage system, arranged in accordance with at least some examples presented herein. The process 601 may include one or more operations, functions, or actions as illustrated by blocks 610, 620, 630, 640, 650, 660, 670, and 680, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 601 may be stored in memory, executed by a processor, and/or implemented in a scalable storage system.

Process 601 may begin at block 610, where a multi-channel interface of the scalable storage system may receive a first request for accessing a first storage node and a second storage node in the scalable storage system. The first storage node and the second storage node may be configured as a part of a daisy-chain in a first storage channel of the scalable storage system. Block 610 may be followed by block 620.

At block 620, the multi-channel interface may transmit the first request to the first storage node via the first storage channel. Specifically, the multi-channel interface may be configured to first transmit the first request to the first storage channel via a first input channel in the multi-channel interface. The first storage channel may then transmit the first request to the first storage node via a first serial link in the first storage channel. In some embodiments, the first storage node may be a head storage node of the daisy-chain of storage nodes, which is coupled with the first input channel. Thus, the request may be delivered from the first input channel directly to the first storage node. Alternatively, the first storage node may be one in the middle of the daisy-chain of storage nodes. In this case, the storage channel may transmit the first request to the head storage node, and then have the first request passing one-by-one through the serial link and the storage nodes that are upstream to the first storage node, until it reaches the first storage node. Block 620 may be followed by block 630.

At block 630, the first storage node may identify a first segment of the first request that is associated with the first storage node, and process the first segment of the first request. The first segment may be a read command, a write command, or a write-data associated with the write command. Upon a determination that the first segment is directed to itself, the first storage node may remove the first segment from the first request before forwarding the rest of first request to subsequent storage nodes downstream. Block 630 may be followed by block 640.

At block 640, simultaneous to the processing of the first segment of the first request, the first storage node may transmit a second segment of the first request to the second storage node via the serial link. The second segment of the first request may be the remaining part of the first request once the first storage node removes the first segment from the first request. Similar to the delivery of the first request to the first storage node, the second segment may be passing one-by-one through the serial link and the storage nodes that are downstream to the first storage node, until it reaches the second storage node. Block 640 may be followed by block 650.

At block 650, the second storage node may process the second segment of the first request, similar to the first storage node's processing of the first segment at block 630. Block 650 may be followed by block 660.

At block 660, the multi-channel interface may transmit a second request to the first storage node via a second storage channel. Specifically, the multi-channel interface may transmit the second request to a second storage channel. In some embodiments, the second storage channel may be a second-dimension storage channel, while the first storage channel may be a first-dimension storage channel. Thus, the second storage channel may also include the first storage node. Afterward, the second storage channel may transmit the second request to the first storage node via a second serial link in the second storage channel. Thus, the first storage node may receive the first request and the second request from the first storage channel and the second storage channel, respectively. Block 660 may be followed by block 670.

At block 670, the first storage node may generate a response associated with the processing of the first segment of the first request. The response may include read-data that is retrieved from a storage unit in the first storage node. Afterward, the first storage node may transmit the response to the second storage node via the serial link, similar to the transmitting of the second segment of the first request to the second storage node in block 640. Block 670 may be followed by block 680.

At block 680, upon receiving the response, the second storage node may transmit the response to the multi-channel interface, simultaneous to the processing of the second segment of the first request. Specifically, if the second storage node is a tail storage node on a daisy-chain, then the second storage node may transmit the response via its output-port to an output channel of the multi-channel interface. If the second storage node is not the tail storage node, then it may forward the response to the storage nodes downstream. Further, the second storage node may perform the transmitting of the response concurrent to the processing of the second segment of the first request, which is initiated at block 650.

FIG. 7 is a block diagram of an illustrative embodiment of a computer program product 700 for implementing a method for providing data storage by a scalable storage system. Computer program product 700 may include a signal bearing medium 702. Signal bearing medium 702 may include one or more sets of executable instructions 704 that, when executed by, for example, a processor, may provide the functionality described above. Thus, for example, referring to FIG. 1, the scalable storage system or the clients may undertake one or more of the operations shown in at least FIG. 6 in response to the instructions 704.

In some implementations, signal bearing medium 702 may encompass a non-transitory computer readable medium 706, such as, but not limited to, a hard disk drive, a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, referring to FIG. 1, computer program product 700 may be wirelessly conveyed to the scalable storage system 130 by signal bearing medium 702, where signal bearing medium 702 is conveyed by communications medium 710 (e.g., a wireless communications medium conforming with the IEEE 802.11 standard). Computer program product 700 may be recorded on non-transitory computer readable medium 706 or another similar recordable medium 708.

Figure 8:
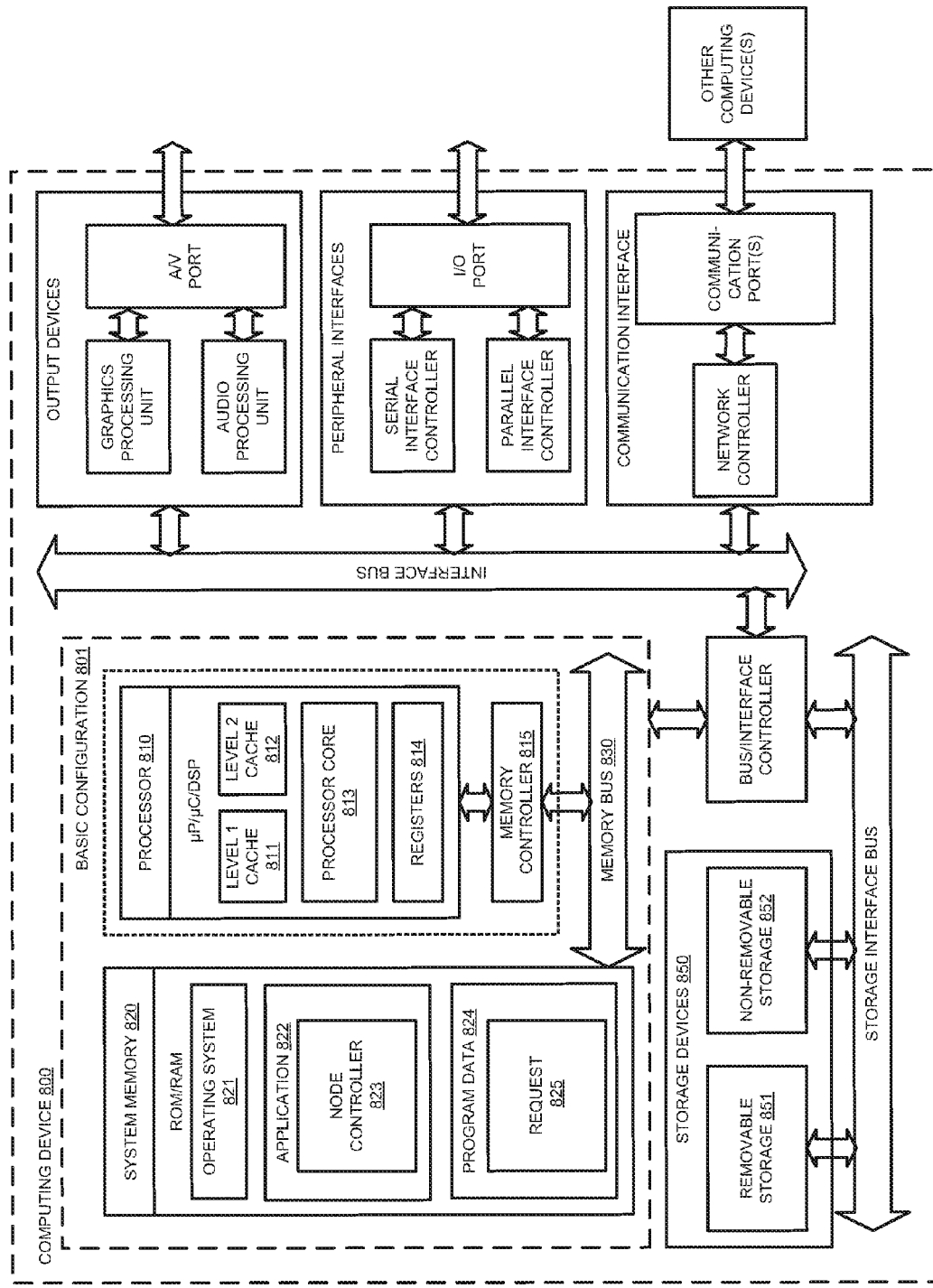
FIG. 8 shows a block diagram of an illustrative embodiment of an example computing device, all arranged in accordance to at least some embodiments of the present disclosure.

FIG. 8 shows a block diagram of an illustrative embodiment of an example computing device 800. In a very basic configuration 801, the computing device 800 may include one or more processors 810 and a system memory 820. A memory bus 830 may be used for communicating between the processor 810 and the system memory 820.

Depending on the desired configuration, processor 810 may be of any type including but not limited to a microprocessor (μP), a microcontroller (μC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. The system memory 820 may include an operating system 821, one or more applications 822, and program data 824. The application 822 may include a node controller 823 that is arranged to perform the functions and/or operations as described herein including at least the functional blocks and/or operations described with respect to the process 601 of FIG. 6. The node controller 823 may be a part of the operating system 821, or be implemented as an embedded hardware accelerator. The program data 824 may include request 825 to be accessed by the node controller 823. In some example embodiments, the application 822 may be arranged to operate with the program data 824 on the operating system 821 such that implementations of the scalable storage system may be provided as described herein. This described basic configuration is illustrated in FIG. 8 by those components within dashed line 801.

Storage device 850, which includes removable storage 851 and non-removable storage 852, and the basic configuration 801 may together be configured to perform the functions and/or operations as described herein. For example, the non-removable storage 852 may correspond to flash pages, which may be accessed for data read and/or write operations. The basic configuration 801 may act as a storage controller that issues commands to access multi-channels in the storage device 850, so that there is high speed access to data stored on removable storage 851 and/or non-removable storage 852.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A storage node configured to provide data storage in a scalable storage system, comprising:

a plurality of input-ports configured to receive data inputs from a multi-channel interface of the scalable storage system;
a plurality of output-ports configured to transmit data outputs to the multi-channel interface of the scalable storage system;
a bypass path coupled with one of the plurality of input-ports and one of the plurality of output-ports;
a storage unit configured to utilize a solid-state storage device, wherein the data inputs and the data outputs are associated with data in the storage unit; and
a data processor coupled with the plurality of input-ports, the plurality of output-ports, and the storage unit, wherein the data processor is configured to:
receive the data inputs via the plurality of input-ports,
in response to a determination that the data inputs contain information relevant to the storage node, process the data inputs by access of the storage unit,
in response to a determination that at least a segment in the data inputs contains information relevant to another storage node that is coupled with one of the plurality of output-ports via a serial link, transmit the segment as the data outputs to the another storage node via the one of the plurality of output-ports, and
in response to a determination that the data inputs are not directed to the storage node, the data processor is configured to transmit the data inputs as the data outputs to the one of the plurality of output-ports via the bypass path.

2. The storage node as recited in claim 1, wherein the data processor is further configured to process the data inputs by:
retrieval of stored-data from the storage unit based on the data inputs, and
transmission of the stored-data as the data outputs via the plurality of output-ports.

3. The storage node as recited in claim 1, wherein the storage unit includes a cache register configured to cache the data inputs received from the plurality of input-ports and the data outputs to be sent via the plurality of output-ports.

4. A method to manage data storage by a scalable storage system, comprising:
receiving, by a multi-channel interface of the scalable storage system, a first request to access a first storage node and a second storage node, wherein the scalable storage system includes a first storage channel and a second storage channel, the first storage node is one of storage nodes linked by a first serial link in the first storage channel, and the second storage node is one of storage nodes linked by a second serial link in the second storage channel;
transmitting in parallel, by the multi-channel interface, the first request to the first storage node via the first storage channel, and the first request to the second storage node via the second storage channel;
processing, by the first storage node, a first segment of the first request that contains information relevant to the first storage node;
during the processing of the first segment of the first request, processing, by the second storage node, a second segment of the first request that contains information relevant to the second storage node;
generating, by the first storage node, a first response associated with the processing of the first segment of the first request;
transmitting, by the first storage node, the first response to the multi-channel interface via the first storage channel;
generating, by the second storage node, a second response associated with the processing of the second segment of the first request; and
during the transmitting of the first response, transmitting, by the second storage node, the second response to the multi-channel interface via the second storage channel.

5. The method as recited in claim 4, wherein the scalable storage system includes a third storage channel, the first storage node is one of storage nodes linked by a third serial link in the third storage channel, and the method further comprising:
transmitting, by the multi-channel interface, a second request to the first storage node via the third storage channel.

6. A scalable storage system, comprising:
a plurality of storage channels, wherein each of the plurality of storage channels includes a corresponding plurality of storage nodes linked by a corresponding serial link, wherein each of the corresponding plurality of storage nodes includes an input-port and an output-port; and
a multi-channel interface including a plurality of input-channels and a plurality of output-channels coupled with the plurality of storage channels,
wherein the corresponding serial link is configured to couple with the input-port and the output-port of the each of the corresponding plurality of storage nodes, and is configured to couple with one of the plurality of input-channels and one of the plurality of output-channels, and
wherein for a first request transmitted from a computer system and received by the multi-channel interface:
the multi-channel interface is configured to transmit the first request in parallel to each of the plurality of storage channels via the plurality of input-channels;
each individual storage node in the plurality of storage channels is configured to process the first request and determine whether the first request is relevant to the individual storage node; and
data retrieved from any storage node in the plurality of storage channels in response to the first request are transmitted out of the plurality of output-channels.

7. The scalable storage system as recited in claim 6, wherein each storage node in the corresponding plurality of storage nodes further includes:
an input buffer coupled with the input-port to buffer inputs received from the input-port; and
an output buffer coupled with the output-port to buffer outputs to be sent via the output-port.

8. The scalable storage system as recited in claim 7, wherein the input buffer includes a cache-register of a flash-based storage device.

9. The scalable storage system as recited in claim 6, wherein each storage node in the corresponding plurality of storage nodes further includes a data processor coupled with the input-port to determine whether the inputs received from the input-port is intended for the storage node.

10. A scalable storage system, comprising:
a plurality of storage channels, wherein each of the plurality of storage channels includes a corresponding plurality of storage nodes linked by a corresponding serial link; and
a multi-channel interface including a plurality of input-channels and a plurality of output-channels coupled with the plurality of storage channels,
wherein for a first request transmitted from a computer system and received by the multi-channel interface:

the multi-channel interface is configured to transmit the first request in parallel to each of the plurality of storage channels via the plurality of input-channels;

each individual storage node in the plurality of storage channels is configured to process the first request and determine whether the first request is relevant to the individual storage node; and data retrieved from any storage node in the plurality of storage channels in response to the first request are transmitted out of the plurality of output-channels, wherein:

the corresponding plurality of storage nodes form a daisy-chain of storage nodes, which include at least a first storage node and a second storage node downstream from the first storage node in the daisy-chain of storage nodes, and the corresponding serial link is configured to relay the first request from the first storage node to the second storage node.

11. The scalable storage system as recited in claim 10, wherein in response to a determination that a first request segment in the first request is to store data to the first storage node, the first storage node is configured to:

extract a first piece of data-to-be-stored from the first request segment;

store the first piece of data-to-be-stored to a first storage unit of the first storage node; and relay a remainder of the first request to the second storage node.

12. The scalable storage system as recited in claim 10, wherein:

in response to a determination that the first request includes a request for a first piece of data stored in the first storage node, the first storage node is configured to retrieve the first piece of data from a first storage unit of the first storage node and transmit the first piece of data to the second storage node via the corresponding serial link; and the second storage node is configured to relay the first piece of data to one of the plurality of output-channels of the multi-channel interface via the corresponding serial link.

13. The scalable storage system as recited in claim 10, wherein in response to a determination that the first request is not directed to the first storage node, the first storage node is configured to bypass the process of the first request and deliver the first request to the second storage node via a bypass path that links an input-port and an output-port of the first storage node.

14. A scalable storage system, comprising:

a plurality of storage channels, wherein each of the plurality of storage channels includes a corresponding plurality of storage nodes linked by a corresponding serial link, and wherein the plurality of storage channels include a first storage channel with a first storage node and a second storage node linked by a first serial link, and a second storage channel with a third storage node and a fourth storage node linked by a second serial link;

a multi-channel interface including a plurality of input-channels and a plurality of output-channels coupled with the plurality of storage channels, wherein for a first request transmitted from a computer system and received by the multi-channel interface:

the multi-channel interface is configured to transmit the first request in parallel to each of the plurality of storage channels via the plurality of input-channels;

each individual storage node in the plurality of storage channels is configured to process the first request and determine whether the first request is relevant to the individual storage node; and data retrieved from any storage node in the plurality of storage channels in response to the first request are transmitted out of the plurality of output-channels; and a third storage channel that includes the first storage node and the third storage node linked by a third serial link, wherein the third storage channel is coupled with one of the plurality of input-channels and one of the plurality of output-channels, and wherein:

for a second request transmitted from the computer system and received by the multi-channel interface, the multi-channel interface is configured to direct the second request in parallel to the first storage channel, the second storage channel, and the third storage channel via the plurality of input-channels.

15. The scalable storage system as recited in claim 14, wherein the first storage node is configured to concurrently process the first request received via the first storage channel and the second request received via the second storage channel.

* * * * *